Jan. 23, 1968     G. SEIFFERT     3,364,948
ALTERNATELY SEATING TEMPERATURE VALVE
Filed May 5, 1965
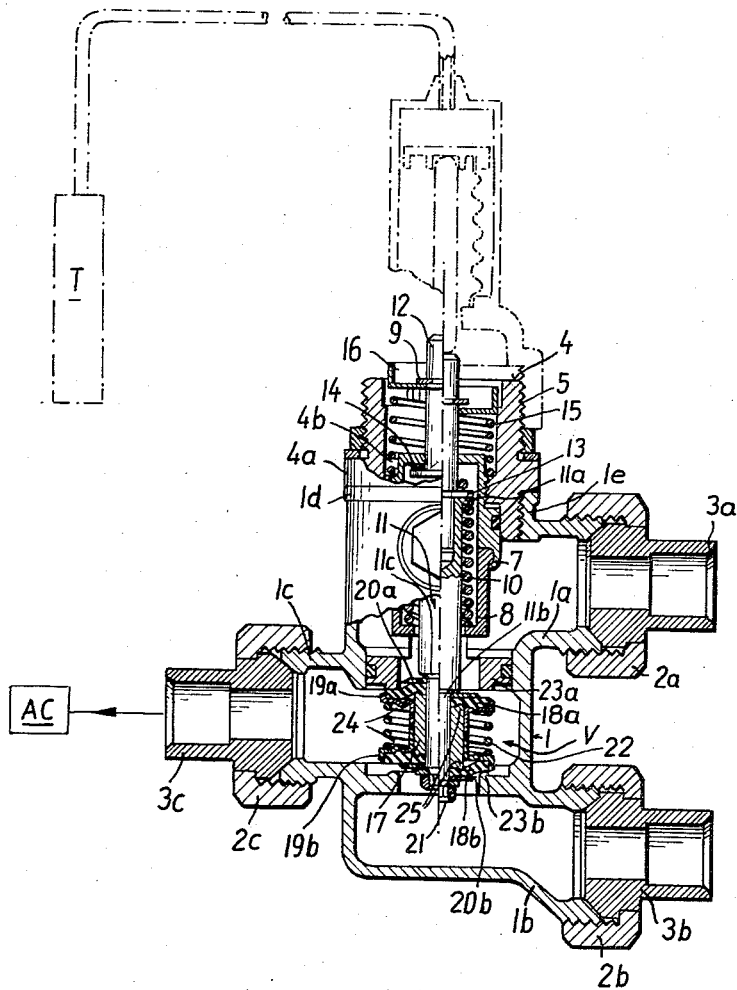
INVENTOR:
GÜNTHER SEIFFERT
BY
Michael S. Striker
his ATTORNEY United States Patent Office 3,364,948
Patented Jan. 23, 1968

3,364,948
ALTERNATELY SEATING TEMPERATURE VALVE
Gunther Seiffert, Roddering 9, Surth, Germany
Filed May 5, 1965, Ser. No. 453,442
Claims priority, application Germany, May 9, 1964,
K 52,908
10 Claims. (Cl. 137—627.5)

ABSTRACT OF THE DISCLOSURE

A valve regulating the flow of two fluids and including a valve body having two separate inlets and an outlet, two spaced coaxial valve seats provided in the valve body and each disposed between the outlet and one of the inlets, a valve stem reciprocably mounted in the valve body and extending with clearance through one of the valve seats, a thermostat or other suitable means for moving the valve stem between a plurality of axial positions including two end positions and an intermediate position, and a composite valve member which is mounted on the valve stem in the space between the two valve seats. The valve member includes a pair of elastic annular sealing elements each of which surrounds a portion of the valve stem, means for biasing each valve element against one of the valve seats in the intermediate position of the valve stem, first motion-transmitting means provided on the valve stem and arranged to move one of the sealing elements away from the respective seat in response to movement of the valve stem to one of its end positions, and second motion-transmitting means mounted on the valve stem and arranged to move the other sealing element away from the respective seat in response to movement of the valve stem to the other end position, so that at least one sealing element abuts against the respective seat in each axial position of the valve stem to prevent mixing of fluids which can enter the valve body through the separate inlets.

The present invention relates to valves in general, and more particularly to an improved temperature valve or temperature-control valve. Such types of valves may be utilized to regulate the flow of heating and cooling media to the heat exchanger of an air conditioning unit and, as a rule, are controlled by thermostats. For example, the valve of my present invention may be utilized to regulate the flow of cool and warm water to the heat exchanger of an air conditioning unit, and the thermostat which controls the valve may be of the liquid-actuated type and may constitute a room thermostat so that primary air or room air may be automatically heated or cooled, depending on the setting of the thermostat and on fluctuations in room temperature.

It is an important object of the present invention to provide a temperature valve which can regulate the flow of two fluids, for example, the flow of cool and warm water, and which is constructed and assembled in such a way that the two fluids cannot mix in the valve body whereby the outlet will invariably receive a first fluid, a second fluid or no fluid at all.

Another object of the invention is to provide a valve of the just outlined characteristics wherein movements which the valve member must perform in order to adjust the valve for flow of the one fluid, of the other fluid, or no fluid at all can be initiated by a relatively weak thermostat and wherein such movements of the valve member must overcome a minimum of friction.

A further object of the invention is to provide a novel valve member for use in a temperature valve of the above outlined characteristics and to construct and assemble the valve member in such a way that its parts need not come in frictional engagement with the valve seats.

An additional object of the invention is to provide a novel connection between the improved valve member and a thermostat.

Still another object of the instant invention is to provide a temperature valve whose parts undergo very little wear in actual use, which can be dimensioned to allow for the flow of several fluids at any desired rate, and wherein the valve member is assembled and mounted in such a way that the sealing action against the passage of one fluid increases at the same rate at which the rate of flow of the other fluid increases so that the possibility that the two fluids would mix in the valve body is non-existent.

A concomitant object of the invention is to provide a very compact and relatively simple temperature valve which may be readily installed in many existing air conditioning units as a substitute for heretofore used valves and which can be readily attached to or detached from the thermostat.

A further object of my invention is to provide a thermostat-controlled temperature valve wherein the seats are subjected to negligible wear and wherein each inlet may receive fluid from a single source or from two or more sources.

Another object of the invention is to provide a temperature valve wherein the valve member may assume an infinite number of intermediate positions each of which will correspond to admission of the one or the other fluid at a different rate and in at least one of which the valve member completely seals the outlet from both inlets.

Briefly stated, one feature of my invention resides in the provision of a temperature valve for regulating the flow of two fluids. The valve comprises a valve body having two separate inlets and an outlet, two spaced coaxial valve seats provided in the valve body and each disposed between the outlet and one of the inlets, a valve stem reciprocably mounted in the valve body and extending with clearance through one of the valve seats, a thermostat or other suitable means for moving the valve stem between a plurality of axial positions including two end positions and an intermediate position, and a composite valve member which is mounted on the valve stem in the space between the two valve seats. This valve member comprises a pair of elastic annular sealing elements each of which surrounds a portion of the valve stem, means for biasing each valve element against one of the valve seats (i.e., away from each other) in the intermediate position of the valve stem, first motion transmitting means provided on the valve stem and arranged to move one of the sealing elements away from the respective seat in response to movement of the valve stem to one of its end positions, with simultaneous deformation of the other sealing element by the respective seat against the action of the biasing means, and second motion transmitting means mounted on the valve stem and arranged to move the other sealing element away from the respective valve seat in response to movement of the valve stem to the other end position with simultaneous deformation of the one sealing element by the respective valve seat against the action of the biasing means so that at least one sealing element abuts against the respective seat in each axial position of the valve stem to prevent mixing of fluids which can enter the valve body through the separate inlets.

In accordance with another feature of my invention, the valve stem is provided with a pair of stops which are outwardly adjacent to the respective motion transmitting means and the confronting sides of the sealing elements are adjacent to rigid sockets which are movable axially toward and away from each other and which transmit the bias of the resilient means to the respective sealing elements.

The novel features which are considered as characteristic of the invention are set forth in particular in the appended claims. The improved temperature valve itself, however, both as to its construction and its mode of operation, together with additional features and advantages thereof, will be best understood upon perusal of the following detailed description of a specific embodiment with reference to the accompanying drawing the single illustration of which is an axial section through a temperature valve which embodies my invention, the valve member and certain other parts of the valve being shown in two different end positions.

Referring to the drawing in detail, there is shown a temperature valve which comprises a body or housing 1 having two separate inlets 1a, 1b and a single outlet 1c. The inlets 1a, 1b are provided with external threads to mesh with nuts 2a, 2b. The nut 2a couples the inlet 1a with the discharge end of a supply conduit 3a for cool water, and the nut 2b couples the inlet 1b with the discharge end of a supply conduit 3b for warm or hot water. The outlet 1c is also provided with external threads and meshes with a nut 2c serving to couple the outlet with the intake end of a third conduit 3c which conveys hot or cool water to an air conditioning unit AC or which may be sealed from both inlets.

The top portion 1e of the valve body 1, as viewed in the drawing, is provided with internal threads meshing with external threads at the lower end of a nipple 4 which is provided with an annular flange 4a abutting against a similar flange 1d at the upper end of the top portion 1e. The upper part of the nipple 4 is also provided with external threads, as at 5, and the median portion of this nipple is formed with internal threads which mesh with external threads provided on an inverted cup-shaped guide member 7. The open lower end of the guide member 7 is sealingly coupled to the open upper end of a second cup-shaped guide member 8. The two guide members 7, 8 together form a cylinder which accommodates a reciprocable piston 11a forming part of a valve stem 11. It will be noted that the upper and lower end walls of the two-piece cylinder 7, 8 are formed with registering bores and that the valve stem 11 extends downwardly through the bore in the end wall of the guide member 8. The internal diameter of the guide member 7 is identical with that of the guide member 8 and the lower chamber of the cylinder 7, 8 accommodates a helical expansion spring 10 which operates between the piston 11a and the end wall of the guide member 8 so as to bias the valve stem 11 upwardly, as viewed in the drawing. The upper or outer end portion of the valve stem 11 is formed with a blind bore which receives the inner end portion of a rod 12, this rod having a collar 13 which abuts against the outer side of the piston 11a. It will be noted that the rod 12 extends upwardly, through the bore in the upper end wall of the guide member 7 and beyond the open outer end of the nipple 4. That portion of the chamber in the guide member 8 which is located above the collar 13 accommodates an elastic sealing ring 14 which abuts against the end wall of the guide member 7 when the rod 12 moves to the upper end position shown in the left-hand part of the drawing.

The rod 12 carries a second collar 9 which is shown in the form of a split ring snapping into a circumferential groove of the rod 12 at a level above the guide member 7. This collar 9 is used as a stop for a spring retainer 16 which cooperates with the guide member 7 and/or with the nipple 4 to maintain a second helical spring 15 in prestressed or precompressed condition. The spring 15 has the tendency to bias the rod 12 upwardly so that the sealing ring 14 is compressed between the end wall of the guide member 7 and the collar 13. It will be seen that the lower convolutions of the spring 15 extend into an annular space 4b defined by the top portion of the guide member 7 and the adjoining portion of the nipple 4 above the internal threads of the nipple. The thermostat T which is used to change the axial position of the rod 12 is operatively connected with the valve body 1 by a nut, not shown, which meshes with the external threads at the upper end of the nipple 4. When the thermostat T is disconnected from the valve, the spring retainer 16 will move to the upper end position shown in the left-hand part of the drawing. In such end position of the spring retainer 16, the ring 14 bears against the end wall of the guide 7 and seals the interior of the cylinder 7, 8 from the atmosphere. The right-hand part of the drawing shows the sealing ring 14, the spring 15 and the retainer 16 in positions which they assume only when the thermostat is properly connected to the valve body 1.

The lower end portion or stud 11b of the valve stem 11 has a reduced diameter so that the valve stem forms a stop shoulder 11c. The stud 11b carries two axially reciprocable annular sealing elements 18a, 18b which are held apart by a cylindrical spacer sleeve 17 and each of which consists of rubber or another suitable elastomeric material. A resilient member here shown as a helical expansion spring 22 surrounds the sleeve 17 with at least some clearance, and its end convolutions are adjacent to the marginal portions of the sealing elements 18a, 18b. The sleeve 17 is surrounded by two axially movable holders or sockets 19a, 19b which overlie the confronting sides of the sealing elements 18a, 18b and which are engaged by the end convolutions of the spring 22. A motion transmitting washer 20a is adjacent to the stop shoulder 11c of the valve stem 11 and abuts against the outer side of the sealing element 18a. A similar motion transmitting washer 20b is provided at the lower end of the stud 11b and abuts against the outer side of the sealing element 18a. This washer 20b is held in the illustrated position by a stop 21 here shown as a nut which is screwed onto the tip of the stud 11b and is preferably non-rotatably fixed thereto, for example, by punch marking or in another suitable way. The diameters of the motion transmitting washers 20a, 20b exceed the internal diameters of the sockets 19a, 19b.

The spring 22 bears against the marginal portions of the sockets 19a, 19b and tends to move them apart so that, and when the valve stem 11 assumes a neutral or central position, the marginal portions of the sealing elements 18a, 18b bear against two coaxial valve seats 23a, 23b. The valve seat 23a is disposed between the inlet 1a and the outlet 1c and its central opening is large enough to allow for passage of the valve stem 11 but is too small to permit passage of the sealing element 18a or socket 19a. The valve seat 23b is disposed between the inlet 1b and the outlet 1c; its central opening is large enough to allow for passage of the washer 20b but is too small to allow for passage of the sealing element 18b or socket 19b. It will be noted that the composite valve member V including the sealing elements 18a, 18b, the sockets 19a, 19b, the washers 20a, 20b, the sleeve 17 and the spring 22 includes two annuli 18a, 19a and 18b, 19b which are biased apart by the spring 22. This valve member V is disposed between the seats 23a, 23b. In the central or neutral position of the valve stem 11, the outer sides of the sealing elements 18a, 18b respectively bear against the adjoining sides of the valve seats 23a, 23b so that the outlet 1c is completely sealed from the inlet 1a and also from the inlet 1b. The sockets 19a, 19b are slidable along the periphery of the spacer sleeve 17 and then cause the marginal portions of the sealing elements 18a, 18b to come in actual abutment with the respective seats 23a, 23b. In such dual sealing position of the composite valve member V, the sealing elements 18a, 18b undergo a certain compression which is sufficient to prevent leakage of warm or cool water, but they undergo little deformation so that each thereof resembles a flat disk. Excessive bending of sealing elements 18a, 18b in response to the bias of the spring 22 is prevented by the sockets 19a, 19b which are directly engaged by the spring 22 and by the motion transmitting washers, 20a, 20b whose diameters are greater than the internal diameters of the sockets 19a, 19b.

In response to upward movement of the valve stem 11, the stop 21 will move the washer 20b and the sealing element 18b away from the valve seat 23b whereby warm water entering at 3b may flow through the inlet 1b, through the central opening of the valve seat 23b and into and through the outlet 1c. When the valve stem 11 is shifted downwardly, its stop shoulder 11c entrains the washer 20a and the sealing element 18a so that the latter moves away from the seat 23a and allows cool water to flow from the inlet 1a to the outlet 1c. It will be seen that the inlets 1a, 1b are fully sealed from each other in each axial position of the valve stem 11. When the sealing element 18a is caused to move away from the seat 23a, the spring 22 causes the element 18b to bear against the seat 23b with an increased force, and vice versa. In other words, the sealing action of the valve member V between the inlet 1a and outlet 1c improves at the same rate at which the flow of warm water to the outlet 1c increases, and vice versa.

Each of the sockets 19a, 19b is provided with an annular centering or locating corrugation 24 which is surrounded by the respective end convolution of the spring 22 and thus prevents lateral shifting of this spring. Each end face of the spacer sleeve 17 is provided with an annular projection or bead 25 which improves the sealing action between the respective sealing element and the periphery of the stud 11b and which also forms a sort of knife edge bearing along which the radially outer portion of the sealing element 18a or 18b is flexed when the valve stem 11 moves to the corresponding end position.

The thermostat T is of the fluid-actuated type and, in the present instance, its purpose is to control the axial position of the valve stem 11 in dependency on changes in room temperature. As stated before, the thermostat T is coupled to the externally threaded portion 5 of the nipple 4.

If the room temperature sinks below the temperature for which the thermostat T is adjusted, the rod 12 moves into or close to the axial position shown in the left-hand part of the drawing. Therefore, the sealing element 18b moves away from the seat 23b and allows warm water to flow from the inlet 1b through the outlet 1c and into the pipes of the heat exchanger in the air conditioning unit AC so that the room temperature rises because primary air surrounding the piping exchanges heat with warm water. As the temperature in the room rises, the thermostat T shifts the rod 12 downwardly, as viewed in the drawing, whereby the collar 13 of the rod 12 bears against the piston 11a and pushes the valve stem 11 downwardly. The spring 10 undergoes compression but the spring 22 is allowed to expand and shifts the sealing element 18b in a direction toward the seat 23b to reduce the flow of warm water from the inlet 1b into the outlet 1c. During such axial (downward) displacement of the valve stem 11, the lower sealing element 18b shares the movement of the stud 11b and does not undergo any deformation because the spring 22 bears against the marginal portion of the socket 19b (i.e., against that portion of the socket 19b which surrounds the respective corrugation 24). However, the deformation of the upper sealing element 18a decreases because this sealing element was deformed by the valve seat 23a in cooperation with the bead 25 at the upper end of the spacer sleeve 17. As the deformation of the sealing element 18a decreases, the spring 22 expands and maintains the marginal portion of this sealing element in sealing engagement with the valve seat 23a so that the passage for the flow of cool water from the inlet 1a to the outlet 1c remains sealed but the rate of warm water flow from the inlet 1b to the outlet 1c decreases. When the valve stem 11 reaches its neutral or median position, the marginal portions of the elements 18a, 18b respectively bear against the seats 23a, 23b and completely seal the outlet 1c from the inlets 1a and 1b. The distance between the seats 23a, 23b and the mounting of the sealing elements 18a, 18b are such that the inlets 1a, 1b are fully sealed from the outlet 1c when the room temperature reaches the desired value corresponding to the selected setting of the thermostat T.

If the room temperature thereupon rises above the desired normal temperature, the thermostat T pushes the rod 12 downwardly beyond an axial position corresponding to the neutral position of the valve stem 11. The stop shoulder 11c then entrains the motion transmitting washer 20a which begins to move the sealing element 18a away from the seat 23a so that cool water can flow from the inlet 1a to the outlet 1c while the inlet 1b remains sealed from the outlet. As the stem 11 descends, the bead 25 at the lower end of the spacer sleeve 17 cooperates with the seat 23b to deform the lower sealing element 18b whereby this sealing element assumes a shape which is shown in the right-hand part of the drawing. The spring 22 is compressed and biases the marginal portion of the sealing element 18b against the corresponding side of the valve seat 23b. Of course, as the piping of the heat exchanger in the air conditioning unit AC receives cool water, the temperature of surrounding air sinks so that such temperature ultimately reaches a value corresponding to the setting of the thermostat T. At such time, the thermostat T allows the rod 12 to move upwardly and the valve stem 11 follows such movement under the bias of the spring 10 which maintains the piston 11a in abutment with the lower collar 13 of the rod 12. The upper sealing element 18a advances toward the underside of the valve seat 23b and the deformation of the lower sealing element 18b decreases until the latter reassumes the shape of a substantially flat disk at a time when the marginal portion of the sealing element 18a returns into sealing engagement with the upper seat 23a. The rod 12 and the valve stem 11 then assume their respective neutral positions and the inlets 1a, 1b are fully sealed from the outlet 1c.

If the room temperature thereupon continues to sink, i.e., if it sinks below the temperature at which the valve stem 11 remains in its neutral position, the thermostat T allows the spring 15 to expand and to move the rod 12 upwardly, as viewed in the drawing, whereby the valve stem 11 follows such movement under the bias of the spring 10 and entrains the stop nut 21 which in turn entrains the motion transmitting washer 20b so that the marginal portion of the lower sealing element 18b begins to move away from the seat 23b and allows warm water to flow from the conduit 3b, through the inlet 1b, through the central opening of the seat 23b, through the outlet 1c, and into the conduit 3c. The bias of the spring 22 is weaker than that of the spring 10 so that the stem 11 will move upwardly with the lower washer 20b when the thermostat T causes or allows the rod 12 to move under the bias of the spring 15.

It will be seen that a relatively short stroke of the valve stem 11 suffices to open or seal the passage between the outlet 1c and inlet 1a or 1b. Therefore, the valve of my invention is capable of responding to relatively small changes in room temperature and will insure that such room temperature fluctuates within a very narrow range. Also, the force produced by the thermostat T is opposed by a minimal frictional force because the sealing elements 18a, 18b merely move into and out of abutment with the corresponding valve seats but need not actually enter such seats. Therefore, any frictional forces developing in response to reciprocation of the rod 12 and valve stem 11 are due solely to friction between the parts 11, 12 and such parts which are used to guide them for movement axially of the valve seats 23a, 23b. This is very important because, as a rule, the forces produced by a thermostat are rather weak and, therefore, the valve will be more sensitive if its valve member V must overcome a minimum of friction when the stem 11 is caused to move between the two end positions. It can be said that, instead of relying on frictional engagement between a valve member and one or more valve seats, I provide a temperature valve wherein the sealing action is due to elastic deformation of certain elements which form part of the valve member V. The sockets 19a, 19b are preferably mounted on the spacer sleeve 17 with such clearance that they are free to move axially even if the water contains calcium carbonate which accumulates on the parts of the valve member.

The axial distance between the valve seats 23a, 23b approximates the combined thickness of the sealing elements 18a, 18b plus the axial length of the spacer sleeve 17. The axial length of the sleeve 17 exceeds the combined axial length of the inner annular portions of the sockets 19a, 19b (i.e., of such annular portions which slidably surround the sleeve 17) by the length of the maximum stroke of the valve stem 11.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A valve for regulating the flow of two fluids, comprising a valve body having two separate inlets and an outlet; two spaced coaxial annular valve seats provided in said body and each disposed between said outlet and one of said inlets; a valve stem extending with clearance through one of said seats and movable axially between a plurality of positions including two end positions and an intermediate position; and a valve member comprising two elastic annular sealing elements mounted on said stem intermediate said seats, a sleeve-like spacer surrounding a portion of said stem intermediate said sealing elements, a pair of rigid annular sockets slidably mounted on said spacer and each overlying the confronting side of the respective sealing element, resilient means located between said sockets and arranged to bias each of said sealing elements, through the intermediary of the corresponding sockets, against one of said seats in the intermediate position of said stem so that said outlet is sealed from both inlets, first motion transmitting means provided on said stem for moving one of said sealing elements away from the respective seat in response to movement of said stem to one of said end positions with simultaneous deformation of the other sealing element by the respective seat against the bias of said resilient means, and second motion transmitting means provided on said stem for moving the other sealing element away from the respective seat with simultaneous deformation of said one sealing element by the respective seat against the bias of said resilient means so that at least one of said sealing elements abuts against the respective seat in each axial position of said stem, each of said motion transmitting means comprising a washer whose diameter exceeds the internal diameter of the corresponding socket and each of said sealing elements being located between one of said washers and one of said sockets.

2. A valve for regulating the flow of two fluids comprising a valve body having two inlets and an outlet; two coaxially arranged spaced valve seats provided in said valve body and each disposed between said outlet and one of said inlets; a valve stem extending with clearance through one of said valve seats and movable axially between a plurality of positions including two end positions and an intermediate position; and a valve member comprising two elastic bendable substantially disc-shaped annular sealing elements firmly mounted at their central portions on said stem intermediate said valve seats with their outer faces located at a distance at least equal to the distance of said valve seats and each engaging one of said valve seats when said valve stem is located in said intermediate position thereof so as to close both said valve seats while when said valve stem is moved into one of said end positions thereof that elastic bendable annular sealing element which is leading in direction of movement will be pressed against the corresponding valve seat and will thereby be bent to such an extent that the other annular sealing element will be moved out of contact with the corresponding other valve seat so as to permit passage of fluid through said other valve seat only while upon movement of said valve stem into the other of said end positions said other annular sealing element will be pressed against the corresponding valve seat and will thereby be bent to such an extent that the one annular sealing element will be moved out of contact with the corresponding one valve seat so as to permit passage of fluid through said one valve seat only.

3. A valve as defined in claim 2, wherein said valve member comprises further means for biasing each of said sealing elements against a respective one of said seats in said intermediate position of said stem.

4. A valve as defined in claim 3, wherein said valve member comprises further spacer means mounted on said stem intermediate said sealing elements and means fixed to said stem and engaging said central portions of said sealing elements at faces thereof facing away from said spacer means for securing said central portions to said stem.

5. A valve as defined in claim 4, wherein said means for securing said sealing elements to said stem comprise a pair of axially spaced stops provided on said stem and respectively located to opposite sides of said valve member.

6. A valve as defined in claim 4, wherein said spacer means comprises a sleeve surrounding a portion of said stem and wherein the distance between said valve seats is smaller than the combined thickness of said sealing elements in unstressed condition plus the axial length of said sleeve.

7. A valve as defined in claim 4, wherein said spacer means comprises a sleeve surrounding a portion of said stem and wherein said valve member includes further a pair of rigid annular sockets slidably mounted on said sleeve, said biasing means being located between said sockets and arranged to bias each of said sealing elements, through the intermediary of the corresponding sockets, against one of said seats in said intermediate position of said stem.

8. A valve as defined in claim 7, wherein said biasing means comprises a helically convoluted expansion spring and wherein at least one of said sockets is provided with means for centering the corresponding end convolution of said spring.

9. A valve as defined in claim 7, wherein each of said sockets comprises an annular portion which slidably surrounds said sleeve, the axial length of said sleeve exceeding the combined length of said annular portions by the length of the maximum stroke of said valve stem.

10. A valve as defined in claim 7, wherein said sleeve has end faces provided with annular projections abutting against the respective sealing elements and constituting bearings about which the sealing elements are flexed in response to movement of said valve stem to the corresponding end positions.

References Cited

UNITED STATES PATENTS

| | | | |
|---|---|---|---|
| 2,747,800 | 5/1956 | Mosely | 236—1 |
| 2,776,796 | 1/1957 | Mosely | 236—1 |
| 3,087,675 | 4/1963 | Honegger | 137—607 X |
| 3,120,103 | 2/1964 | Beard | 137—627.5 X |
| 3,151,624 | 10/1964 | Koutnik | 137—627.5 X |
| 3,298,395 | 1/1967 | Lewis | 137—607 |

CLARENCE R. GORDON, *Primary Examiner.*